3,317,624
PROCESS FOR PURIFYING ALPHA OLEFINS WITH SnCl₄ AND HCl

William H. Clement, Cincinnati, Ohio, Howard M. Peters, Palo Alto, Calif., and Charles M. Selwitz, Pitcairn, Pa., assignors to Gulf Research & Development Company, Pittsburgh, Pa., a corporation of Delaware
No Drawing. Filed May 20, 1964, Ser. No. 369,014
8 Claims. (Cl. 260—677)

This invention relates to a process for purifying a normal alpha olefin.

Ethylene can be polymerized in the presence of a trialkyl aluminum, such as triethyl aluminum, at a temperature of about 140° to about 325° C. and a pressure of about 1000 pounds per square inch gauge to as high as about 1000 atmospheres, or even higher, for about five to and 120 minutes to obtain a mixture containing about 85 to about 95 mol percent of normal alpha olefins, about one to about 10 mol percent of internal straight chain normal olefins, about one to about 10 mol percent of trisubstituted monoolefins, that is, compounds of the structural formula $R_2C=CHR$, wherein R is an alkyl group, and about one to about 10 mol percent of vinylidenes, that is compounds of the structural formula $R_2C=CH_1$, wherein R is an alkyl group. The olefins so obtained will have predominantly from two to twenty carbon atoms, although lesser amounts of olefins having from 22 to 60 carbon atoms will also be produced.

The mixture defined above can be treated, for example, by distillation, to recover individual normal alpha olefins or fractions containing several individual normal alpha olefins. Unfortunately the other olefins defined above will remain in association with the individual normal alpha olefins or fractions containing the several individual normal alpha olefins. A particularly attractive fraction obtained from the olefin mixture defined above is one containing $C_{12}$, $C_{14}$ and $C_{16}$ normal alpha olefins which can be employed in a reaction with benzene to form a straight chain alkyl benzene which can then be sulfonated, or otherwise treated, to form a highly biodegradable detergent. In such cases in particular, and others as well, the vinylidenes and trisubstituted contaminants are not desirable, since they will react with benzene to form branch chain alkyl benzenes which when sulfonated will form detergents which are not highly biodegradable. By following the procedure defined and claimed herein the total amount of such contaminants associated with the normal alpha olefins is appreciably reduced.

We have discovered that a normal alpha olefin or mixtures of normal alpha olefins admixed with trisubstituted monoolefins and/or vinylidenes of the type defined above can be treated with anhydrous SnCl₄ and anhydrous HCl in order to reduce the content of said trisubstituted monoolefins and/or vinylidenes. As a result of such treatment we believe a small amount of the normal alpha olefins are isomerized to trans and/or cis internal straight chain olefins, some vinylidenes are isomerized to trisubstituted monoolefins and trisubstituted monoolefins and vinylidences are polymerized to dimers, trimers and other low molecular weight polymers. In any event the mol percent of the desired normal alpha olefins in the final product will be increased as a result of such treatment, and while in general the mol percent of the trisubstituted monoolefins may be increased slightly, the total mol percent of the undesired trisubstituted monoolefins and vinylidenes will be substantially reduced.

The procedure of this invention resides in contacting a mixture containing at least one normal alpha olefin and at least one trisubstituted olefin and/or at least one vinylidene under selected reaction conditions with anhydrous SnCl₄ and anhydrous HCl. While the reaction conditions are not critical they must be closely followed in order to obtain the beneficial results of this invention. Thus, the temperature required can be from about −10° to about 75° C., preferably about 20° to about 40° C. Pressure will have little effect on the course of the reaction. In any event a pressure of about one to about 100 pounds per square inch absolute, preferably about 10 to about 30 pounds per square inch absolute, can be employed. The mixture to be treated and the anhydrous SnCl₄ and anhydrous HCl employed are maintained in intimate contact with each other for a period which can be, for example, from about one to about 1000 minutes, preferably from about 10 to about 100 minutes. The amount of anhydrous SnCl₄ employed can desirably be from about 0.1 to about 50 percent by weight, preferably from about one to about 10 percent by weight, based on the total amount of trisubstituted and/or vinylidenes present in the mixture being treated. The amount of anhydrous HCl employed can desirably be from about 0.1 to about 100 percent by weight, preferably from about one to about 25 percent by weight, based on the total amount of trisubstituted and/or vinylidenes present in the mixture being treated. Obviously, amounts in excess of the defined amounts of anhydrous SnCl₄ and anhydrous HCl can be employed, but would not be economical because of increased costs.

Upon completion of the reaction the treated mixture is contacted with at least about 20 percent by weight of an aqueous solution of an inorganic acid, such as hydrochloric acid, hydrobromic acid, sulfuric acid, phosphoric acid, etc., in order to dissolve and thereby remove the anhydrous SnCl₄ and anhydrous HCl from the treated mixture. The aqueous layer containing substantially all of the SnCl₄ and anhydrous HCl is separated from the hydrocarbon layer, and the latter is then treated with a basic reagent, such as sodium bicarbonate, calcium carbonate, calcium oxide, etc., water or basic aqueous solutions to remove the remaining acidic material present in said hydrocarbon layer. The resulting mixture can then be distilled at a temperature of about 20° to about 200° C. and a pressure of about 0.001 to about 15 pounds per square inch absolute. As a result of such distillation, heavier materials, which are believed to be dimers, trimers and other low molecular weight polymers of the trisubstituted monoolefins and/or vinylidenes, remain behind and the organic fraction containing the normal alpha olefins, internal olefins and trisubstituted monoolefins and/or vinylidenes still remaining in association with the normal alpha olefins are removed overhead as desired product.

A particularly significant feature of the present procedure resides in the fact that neither anhydrous SnCl₄ alone nor anhydrous HCl alone can be employed in the present context to obtain the desired results. In each instance when anhydrous SnCl₄ alone or anhydrous HCl alone are employed there is no significant improvement in the treated composition.

The invention can further be illustrated by the following. Several runs were made at atmospheric pressure wherein anhydrous SnCl₄, anhydrous HCl or a combination of the two were added to 50 grams of dodecene-1. The mixtures were stirred for one hour at 25° C. and then quenched and hydrolyzed with 3 N hydrochloric acid. After the aqueous layer was removed therefrom the organic layer was extracted twice with 75 milliliter portions of dilute sodium bicarbonate, washed three times with 75 milliliter portions of water and dried over anhydrous sodium sulfate. The organic layer was then distilled at a temperature of 52 to 75° C. and 1.2 mm. of mercury. There was distilled 42.7 grams of product and there was obtained 1.6 grams of residue, believed to be polymer, and 40.5 grams of overhead. The latter was analyzed by infrared. The results obtained are tabulated below in Table I.

TABLE I

| Run No. | Charge | 1 | 2 | 3 |
|---|---|---|---|---|
| Anhydrous HCl, grams | | 0.3 | | 0.3 |
| Anhydrous SnCl₄, grams | | | 0.8 | 0.1 |
| Olefin Isomer Distribution, Mol Percent: | | | | |
| $RCH=CH_2$ | 93.9 | 94.3 | 93.7 | 96.2 |
| $RCH=CHR$ (Cis and Trans) | 1.7 | 1.5 | 1.6 | 1.2 |
| $R_2CH=CH_2$ | 3.7 | 3.9 | 4.3 | 1.0 |
| $R_2C=CHR$ | 0.7 | 0.3 | 0.4 | 1.6 |

The results obtained by following the procedure of the invention defined and claimed herein are apparent from an examination of the data in Table I. The use of anhydrous HCl alone increased somewhat the molar concentration of the normal alpha olefins but also increased somewhat the vinylidene concentration. The use of anhydrous SnCl₄ alone resulted in a treated mixture having a lower normal alpha olefin concentration and a higher vinylidene concentration. However in Run No. 3 when anhydrous SnCl₄ and anhydrous HCl were employed, the normal alpha olefin concentration was appreciably increased and the vinylidene concentration was appreciably decreased. It should be noted that the total amount of anhydrous SnCl₄ and anhydrous HCl employed in Run No. 3 was far less than the amount of SnCl₄ employed in Run No. 2. The results obtained in Run No. 3 are extremely surprising in light of the results obtained in Runs Nos. 1 and 2.

Obviously, many modifications and variations of the invention, as hereinabove set forth, can be made without departing from the spirit and scope thereof, and therefore only such limitations should be imposed as are indicated in the appended claims.

We claim:
1. A process which comprises:
    contacting a first mixture containing predominantly at least one normal alpha olefin and lesser amounts of at least one substituted olefin selected from the group consisting of tri-substituted monoolefins and vinylidenes,
    with a second mixture containing about 0.1 to about 50 percent by weight of anhydrous SnCl₄ and about 0.1 to about 100 percent by weight of anhydrous HCl, under conditions to selectively polymerize said substituted olefins.
2. A process according to claim 1 wherein the amount of SnCl₄ is between about one and about 10 percent by weight and the amount of HCl is between about one and about 25 percent by weight.
3. A process according to claim 1 wherein the temperature during contacting is between about −10° and about 75° C.
4. A process according to claim 2 wherein the temperature during contacting is between about 20° and about 40° C.
5. A process according to claim 3 and thereafter separating the resulting olefinic mixture from said anhydrous SnCl₄ and anhydrous HCl.
6. A process according to claim 4 and thereafter separating the resulting olefinc mixture from said anhydrous SnCl₄ and anhydrous HCl.
7. A process according to claim 5 wherein said first mixture contains predominantly a C₁₂ normal alpha olefin and lesser amounts of at least one C₁₂ substituted olefin selected from the group consisting of trisubstituted monoolefins and vinylidenes.
8. A process according to claim 6 wherein said first mixture contains predominantly a C₁₂ normal alpha olefin and lesser amounts of at least one C₁₂ substituted olefin selected from the group consisting of trisubstituted monoolefins and vinylidences.

References Cited by the Examiner

UNITED STATES PATENTS 2,065,474 12/1936 Cunradi et al. ____ 260—683.15
2,342,074 2/1944 Deanesly et al. _____ 260—677

OTHER REFERENCES

Friedel-Crafts and Related Reactions, vol. I, pages 206, 207 and 856 (1963), Interscience Publishers, New York.

ALPHONSO D. SULLIVAN, *Primary Examiner.*

UNITED STATES PATENT OFFICE
CERTIFICATE OF CORRECTION

Patent No. 3,317,624                           May 2, 1967

William H. Clement et al.

It is hereby certified that error appears in the above numbered patent requiring correction and that the said Letters Patent should read as corrected below.

Column 1, line 18, for "and" read -- about --; line 25, for "$R_2C=CH_1$" read -- $R_2C=CH_2$ --; same column 1, line 60, and column 4, line 33, for "vinylidences", each occurrence, read -- vinylidenes --; column 4, line 22, for "olefinc" read -- olefinic --; line 39, for "260-677" read -- 260-676 --.

Signed and sealed this 21st day of November 1967.

(SEAL)
Attest:

Edward M. Fletcher, Jr.                        EDWARD J. BRENNER

Attesting Officer                               Commissioner of Patents